June 5, 1956  T. R. SMITH  2,749,154
TUBE LOCKING AND SEALING CONSTRUCTION
Filed Feb. 23, 1952

INVENTOR.
Thomas R. Smith
BY
James K. Mosser
AGENT

United States Patent Office 2,749,154
Patented June 5, 1956

2,749,154
TUBE LOCKING AND SEALING CONSTRUCTION

Thomas R. Smith, Newton, Iowa, assignor to The Maytag Company, Newton, Iowa, a corporation of Delaware Application February 23, 1952, Serial No. 273,085

4 Claims. (Cl. 285—173)

The invention relates to a tube connector and seal and more particularly to a connector for securing and sealing the end of a fluid conducting tube to a coupling or body member.

In accordance with the invention, the end of a fluid conducting tube is inserted in a recessed portion of an enlarged body member. Mounted within this recess is an annular resilient sealing element having inner and outer diameters proportioned so as to result in slight radial compression when placed in the recess and over the tube, a back-up washer and a lock washer with a spring washer disposed between the two. Adjacent one edge of the lock washer is a clamping or retaining member which, when positioned, holds that edge of the lock washer substantially flush with the body member and increases the axial pressure on the sealing element while, at the same time, the spring acting on the free edge of the lock washer applies an axial force to tilt or rock the same about the tube axis, which results in the lock washer gripping the tube to prevent axial displacement.

In accordance with the above, it is an object of the invention to provide a tube connector which eliminates the use of special threaded connectors and ferrules.

It is another object of the invention to provide a tube connector which has a single eccentrically located clamping means for compressing the sealing element and locking the tube in position.

It is another object of the invention to provide a fluid conducting tube connection which reduces the necessary overall wall thickness of the assembly and with the body member enclosing substantially the entire tube clamping means.

It is still another object of the invention to provide a fluid conducting tube with a connection, the parts of which may be formed from a plurality of standard readily purchased or fabricated elements.

Other objects, features, capabilities and advantages are comprehended by the invention, as will later appear and as are inherently possessed thereby.

Referring to the drawings.

Figure 1:
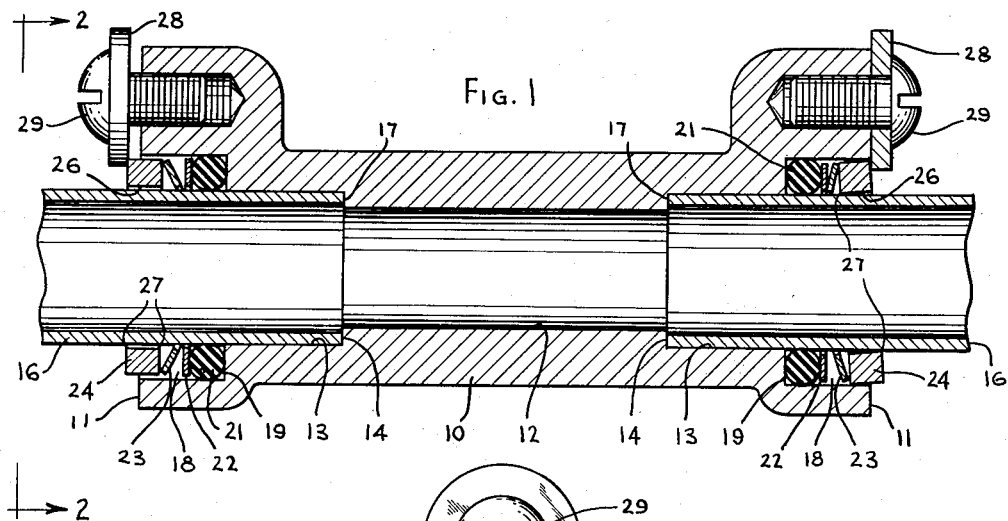
Figure 1 is a vertical longitudinal sectional view of fluid conducting tubing terminating in a body member or coupling with the improved connecting means applied thereto.
Figure 2:
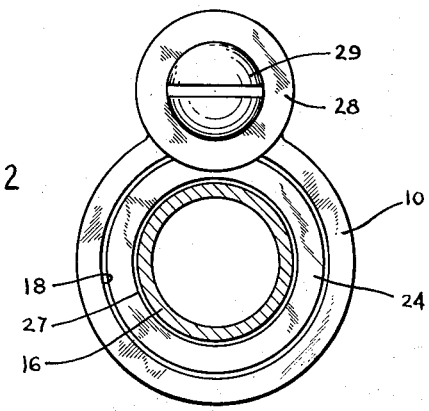
Figure 2 is a vertical transverse sectional view taken at one end of the body member along the line 2—2 of Figure 1 showing the eccentric clamping means.
Figure 3:
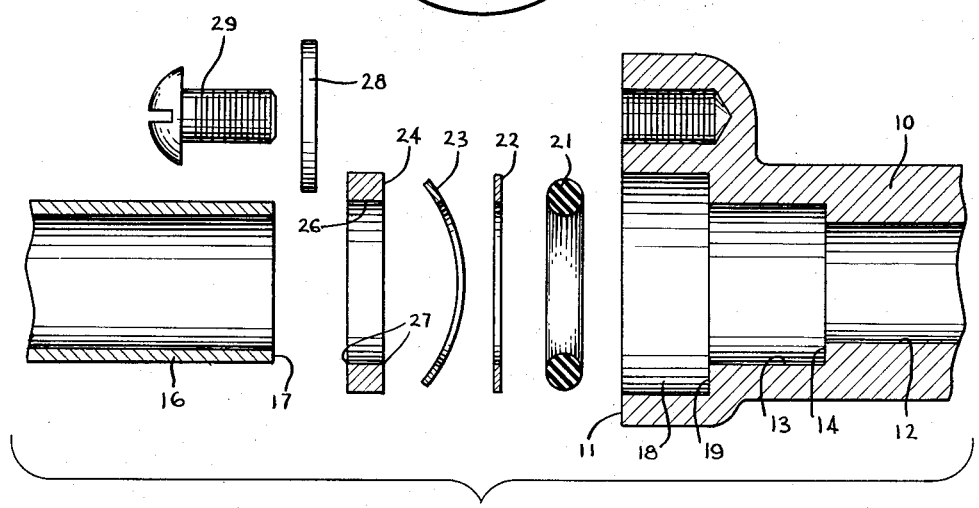
Figure 3 is an exploded longitudinal sectional view of the elements shown in Figure 1.

Referring now to the drawings for an illustrative embodiment of the present invention, there is shown a body member or coupling 10 having spaced end walls 11 with a fluid conducting passage 12 extending therethrough and opening at the end walls. An enlarged cylindrical guide surface 13 terminating in a radial shoulder 14 is provided about the passage 12 adjacent each end wall 11 but inwardly therefrom, each of which closely fits and guides a fluid conducting tube or conduit 16 whose innermost end 17 abuts against the respective radial shoulder 14 to limit inward movement. The body member is further relieved inwardly from its end walls 11 and about the tube 16 to provide an enlarged annular recess 18 which terminates in a radial face or shoulder 19 for the reception of a fluid sealing means and a tube clamp or locking device.

As shown, the sealing means is in the form of a standard type annular or O-ring sealing element 21 formed from suitable resilient material, such as, for example, natural or synthetic rubber or the like and it preferably has an outer diameter slightly larger than the diameter of the enlarged recess 18 and an inner diameter slightly smaller than the outer diameter of the tube 16 so that, when positioned, radial compression is applied from both sides to provide an effective seal.

An O-ring sealing element 21 is carried in each recess with its innermost portion resting against the radial shoulder 19 and a flat thrust or back-up washer 22 having relatively loose clearance with respect to the recess and tube, is positioned to contact the opposite or outer side of the O-ring 21. Disposed on the opposite side or face of the back-up washer 22 is a suitable resilient or spring type washer 23 which in turn contacts or abuts a lock or clinch washer 24 whose outer surface or face projects beyond the end wall 11 of the body member. This lock washer is preferably formed from flat material and its opening or hole 26 therethrough has a diameter which is slightly larger than the outer diameter of the tube 16 and its outer diameter is smaller than the diameter of the recess so that the washer is free to tilt therein without binding in the recess. In addition, the opening 26 provides a pair of relatively sharp corners 27 at the opposite faces of the washer to provide gripping or clinching edges.

Adjacent one edge or sector of the lock washer 24 is a clamping means or washer 28 and a securing means or screw 29 threaded into the body member for holding the entire assembly in position. With one edge of the lock washer held adjacent the end wall 11, as shown at the right in Figure 1, the spring washer 23 acting against the back-up washer 21 and the free or unclamped edge portion of the lock washer 24, causes the same to pivot at the point of contact with the clamping washer 28 and tilt with respect to the centerline of the tubing. Since the outside diameter of the lock washer 24 is dimensioned so as not to contcat or bind in the recess 18, the opposite corners 27 at the inner opening 26 of the washer are moved into contact with the tube at diametrically opposite points. This action provides a firm grip or clinch for the tube 16 and prevents removal from the body member under ordinary operating conditions.

Due to the clinching action of the lock washer 24, should an outward force be applied to the tubing, this force would tend to increase tilting of the lock washer to thus increase the clinching or gripping effect. Also, the spring washer 23 acting between the clamping washer 28 and back-up washer 22, tends to increase the axial compression on the sealing element 21 to improve the seal. It is to be noted that, when the combined sealing and locking means is in position, substantially the entire assembly is enclosed by the body member 10 and that, with a single clamping means the overall wall thickness of the body member may be reduced considerably and the assembly occupies a minimum amount of space.

In assembling the connection, the lock washer 24, spring washer 23, flat washer 22, and O-ring 21 are placed over the end 17 of the tube 16 in the order mentioned, and the end 17 of the tube is then inserted into the enlarged portion of the passage guided by the surface 13 until it contacts the radial shoulder 14. At the same time, the above mentioned elements are positioned in the recess 18. The clamping washer 28 and securing screw 29 are then placed in position at which time the connector is in condition to be tightened, as clearly shown at the left in Figure 1. By any suitable means a substantially uniform axial compression is applied on the outer face of the lock washer 24 to compress the spring 23 and when the outer face of the lock washer is substantially flush with the end wall, the screw is tightened until the clamping washer 28 abuts the end wall, after which the axial pressure is removed. Upon removal of this pressure, the lock washer pivots or tilts at the edge of the clamping washer 28 and its free end moves outwardly under the compression of the spring until the diametrically opposed corners 27 grip or clinch the tube as previously mentioned.

While the above procedure is one means of assembling the unit, it may also be assembled by inserting all of the elements as above mentioned in the recess in the reverse order, whereupon the tube is then inserted through the openings in the elements and seated in position against the radial shoulder 14.

To remove the tube, the operator need but loosen the screw 29 holding the clamping means 28 and the spring washer 23 will automatically straighten the lock washer 24. This action will release the gripping corners 27 of the lock washer whereupon the tube may be then readily removed without further disturbing the assembly, or, if desired, the screw and clamping means may be removed and the entire assembly removed with the tubing.

Although the above connector is disclosed as applied to a simple coupling, it is to be understood that the tube may be equally as well secured to any suitable body member, such as, for example, a valve body or the like.

From the foregoing, it can be seen that a simplified connector for a fluid conducting tube has been provided which may be for the most part completely fabricated from standard low cost washer elements and the sealing means is a standard O-ring, and that the locking means is effective without danger of damage to the tubing and increases should an extraneous withdrawing force be applied to either the tubing or body member which tends to cause relative axial shifting movement; also the major portion of the assembly is carried within a recess in the body member to reduce the exposed parts to a minimum and the overall body thickness of the body member about the tubing may be reduced because threaded connections and ferrules and the like have been eliminated.

While I have herein described and upon the drawings shown an illustrative embodiment of the invention, it is to be understood that the invention is not limited thereto but may comprehend other constructions, arrangements of parts, details and features without departing from the spirit of the invention.

It is claimed:

1. In a fluid conducting tube connector, the combination of a body member having a passage therethrough and an end wall with an enlarged recess surrounding said passage at said end wall, a fluid conducting tube extending through said recess and aligned with said passage, an annular resilient sealing element carried in said recess to contact and seal said tubing, a tiltable clinching washer having an opening providing corners closely surrounding said tube within said recess, clamping means carried on the outer portion of said end wall for holding one edge of said clinching washer substantially flush with said end wall, and a spring washer disposed in said recess between said clinching washer and said resilient sealing element for applying an axial sealing force to said sealing element and a tilting movement to said clinching washer at said clamping means and about the tube axis to cause the corners at the opening of said clinching washer to engage said tube to grip the same and oppose separation of said tube and body member.

2. A tube connector, comprising a body member having an end wall and a passage therethrough with a surrounding recess adjacent its end wall, a fluid conducting tube having an end extending in said passage and surrounded by said recess, a resilient O-ring sealing element disposed in said recess to engage said tubing to provide a fluid seal thereat, a back-up washer carried in said recess adjacent said sealing element, a spring washer having one side contacting said back-up washer, a lock washer disposed on the other side of said spring washer and having an outer diameter less than said recess and an inner diameter greater than said tubing, said lock washer further including an anchoring edge and a free edge, a clamping washer carried adjacent the anchoring edge of said lock washer externally of said body member to provide a pivot for said lock washer and to compress said spring washer, and means for holding said clamping washer against the end wall of said body member to hold the anchoring edge of said lock washer in an inner position, said spring washer acting in one direction on the free edge of said lock washer to tilt the same about the tube axis and cause the corners at the inner diameter of said lock washer to contact said tubing to hold the same against relative movement with respect to said body member and in the other direction to compress said O-ring sealing element to improve the sealing action.

3. A hydraulic coupling comprising, a body member provided with a recess, a passageway extending through said body member in alignment with said recess, a tubular member extending into said passageway and terminating therein, a resilient sealing element positioned in said recess and encircling said tubular member to provide a seal between said body member and said tubular member, a back-up washer aligned with and abutting said sealing element, a lock washer provided with gripping edges loosely encircling said tubular member, said lock washer being further provided with a radial surface facing away from said recess, anchor means connected to said body member and engaging said radial surface of said lock washer for canting of said lock washer about said anchor means at the point of engagement between said anchor means and said radial surface, and spring means abutting said back-up washer and said lock washer for resiliently urging said back-up washer against said sealing element and canting said lock washer at said point of engagement to force said gripping edges into frictional engagement with said tubular member to limit axial movement of said tubular member with respect to said body member.

4. A hydraulic coupling comprising, a body member provided with a recess, a passageway extending through said body member in alignment with said recess, a tubular member extending into said passageway and terminating therein, abutment means in said body member limiting axial movement of said tubular member into said body member, a resilient sealing element positioned in said recess and encircling said tubular member to provide a seal between said body member and said tubular member, a back-up washer aligned with and abutting said sealing element, a lock washer provided with gripping edges loosely encircling said tubular member, said lock washer being further provided with a radial surface facing away from said recess, anchor means connected to said body member and engaging said radial surface of said lock washer for canting of said lock washer about said anchor means at the point of engagement between said anchor means and said radial surface, and spring means abutting said back-up washer and said lock washer for resiliently urging said back-up washer against said sealing element and canting said lock washer at said point of engagement to force said gripping edges into frictional engagement with said tubular member to limit axial movement of said tubular member with respect to said body member.

References Cited in the file of this patent

UNITED STATES PATENTS

| 1,371,632 | Latimer | Mar. 15, 1921 |
| 2,268,456 | Meyer | Dec. 30, 1941 |
| 2,360,732 | Smith | Oct. 17, 1944 |
| 2,448,888 | Hynes | Sept. 7, 1948 |

FOREIGN PATENTS

| 576,705 | Great Britain | Apr. 16, 1946 |
| 808,658 | Germany | July 16, 1951 |